Nov. 1, 1966  L. W. KLECKNER  3,282,560
JET REACTION TURBINE

Filed June 15, 1965  3 Sheets-Sheet 1

*INVENTOR*
Loyal W. Kleckner
*by*
SPARROW AND SPARROW

ATTORNEYS.

Nov. 1, 1966  L. W. KLECKNER  3,282,560
JET REACTION TURBINE

Filed June 15, 1965  3 Sheets-Sheet 2

*INVENTOR*
Loyal W. Kleckner
*by*
SPARROW AND SPARROW
ATTORNEYS

Nov. 1, 1966    L. W. KLECKNER    3,282,560
JET REACTION TURBINE

Filed June 15, 1965    3 Sheets-Sheet 3

INVENTOR.
Loyal W. Kleckner by
SPARROW AND SPARROW
ATTORNEYS

3,282,560
JET REACTION TURBINE
Loyal W. Kleckner, Riant-Chateau, Ave. Riviera 4,
Terrritet, Switzerland
Filed June 15, 1965, Ser. No. 464,004
5 Claims. (Cl. 253—77)

This invention relates to fluid-driven rotary power engines in general and to certain improvements in such engines in particular. The basic structure of the rotary engine of this invention is either a single stage or a multi-stage jet-propelled turbine, as it has been disclosed in my United States Patent No. 3,032,988. The present invention consists in such novel features, construction arrangements, combinations of parts and improvements as may be shown and described in connection with the apparatus herein disclosed by way of example only and as illustrative of a preferred embodiment. Objects and advantages of the invention will be set forth in part hereinafter and in part will be obvious herefrom or may be learned by practicing the invention, the same being realized and attained by means of the instrumentalities and combinations pointed out in the appended claims.

The general object of this invention is to provide contrivances for structural improvements at both the input and the output ends of the turbine housing for the bearing supports of the rotor of the turbine.

Another object of the invention is to provide improvements on sealing of the bearings of the turbine rotor shaft ends against entering of the propellant media into said bearings.

A further object of the invention is to provide improved means for insulating the rotor bearings from the pressurized areas of the turbine.

Various further and more specific purposes, features and advantages will clearly appear from the detailed description given below taken in connection with the accompanying drawings which form part of this specification and illustrate merely by way of example several embodiments of the device of the invention.

In the following description and in the claims, parts will be identified by specific names for convenience, but such names are intended to be as generic in their application to similar parts as the art will permit. Like reference characters denote like parts in the several figures of the drawings, wherein:

Figure 1:
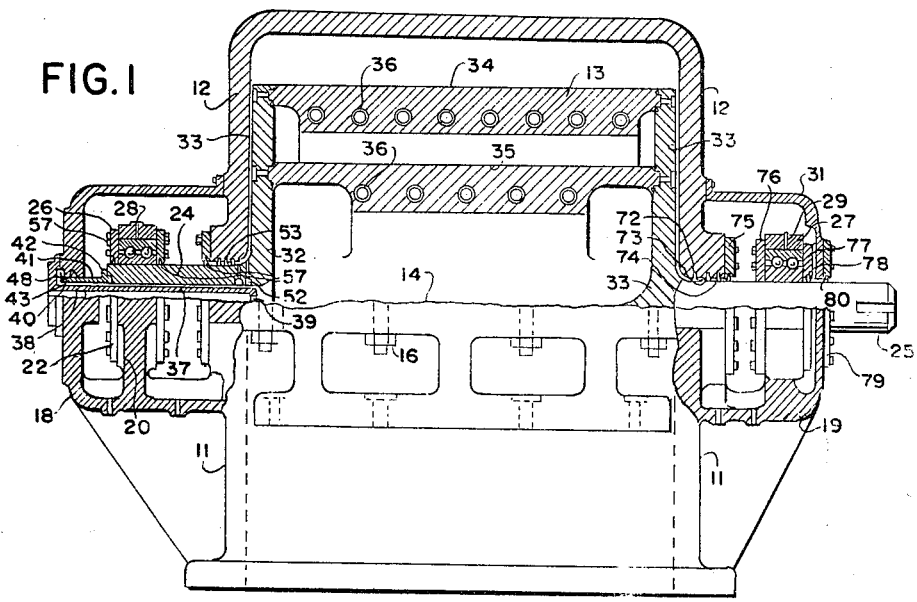
FIG. 1 shows a longitudinal elevation of a two-stage jet turbine for steam or compressed air, partly in section.
Figure 2:
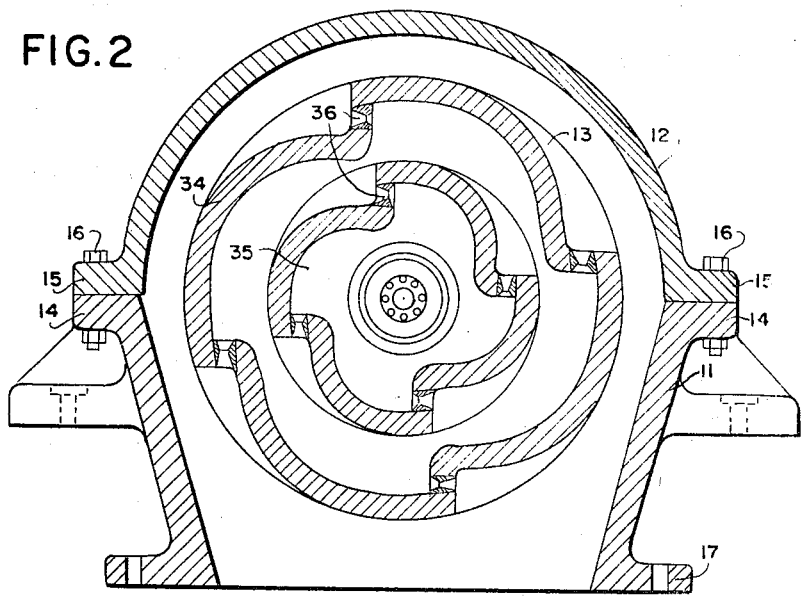
FIG. 2 shows a partial cross-section of the turbine shown in FIG. 1.
Figure 3:
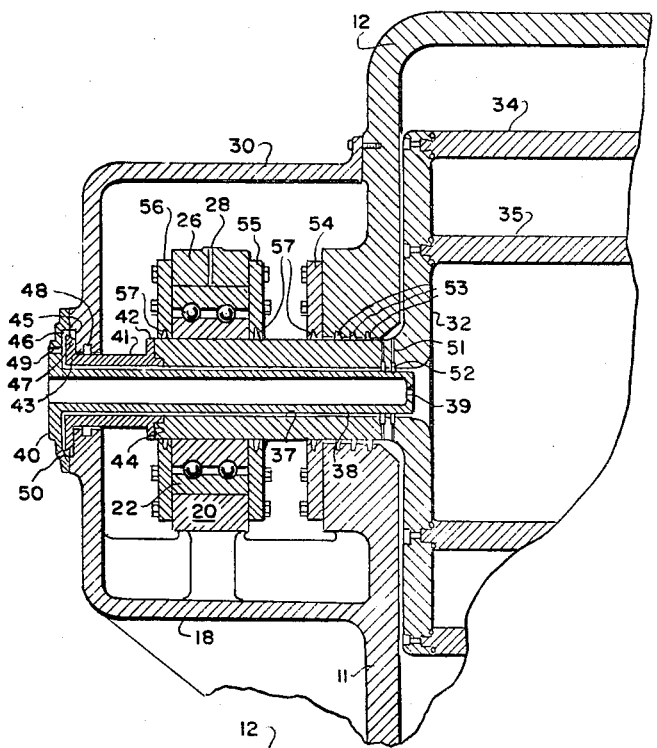
FIG. 3 shows a longitudinal section of the intake end of the turbine shown in FIG. 1 in a larger scale, broken away.

Referring now in more detail to the drawing which illustrates several preferred embodiments by which the invention may be realized, there is shown in FIGS. 1 to 4 a jet turbine for steam or compressed air, which embodies an improvement on the turbine disclosed in my United States Patent No. 3,032,988, FIGS. 1 to 6. It is basically composed of the housing consisting of a lower part 11 and of an upper part 12 and of a single stage or of a multi-stage rotor 13 which is rotatably located in anti-friction bearings in housing 11 and 12. Lower housing part 11 and upper housing part 12 are bolted together by means of flanges 14, 15 and screws 16; lower housing 11 has further flanges 17 for fastening it to a suitable foundation (not shown in the drawing). Lower housing 11 has two extensions 18 and 19 in which bearing brackets 20 and 21 are integrally arranged for anti-friction bearings 22 and 23, for the shaft ends 24 and 25 of rotor 13.

Bearing caps 26, 27 are arranged for being bolted to bearing brackets 20 and 21, for holding anti-friction bearings 22, 23 in place. Caps 26, 27 have bores 28, 29 for lubrication purposes. Caps 30, 31 are enclosing bearings 22, 23 and shaft ends 24, 25.

Rotor 13, as shown in FIGS. 1, 2, 3 and 4, is arranged for steam or compressed air operation and consists of two solid end discs 32, 33 which also include shaft ends 24, 25. Two or more nozzle bodies 34, 35 (for multi-stage operation) are bolted to end discs 32, 33, respectively. Rows of jet stream emitting nozzles 36 are axially arranged in bodies 34, 35 in such manner that a multiple expansion of the steam or compressed air can be put to effective use.

Shaft end 24 has an axial bore 37 through which the stationary feed pipe 38 (for steam or compressed air) is inserted. At the inner end of pipe 38 the nozzle 39 is arranged, at the outer end of flange 40 is formed on pipe 38 for bolting same to extension 18 and cap 30 respectively. A tube-like extension 41 having a flange 42 on one side thereof and having a disc 43 on the other end thereof, is bolted to the end face 44 of shaft end 24. A cavity 45 is formed on the outside of extension 18 and cap 30 (see FIG. 3). A corresponding cavity 46 is formed on the inside of flange 42. Disc 43 having a beveled edge 47 can rotate freely in cavity 45, 46. A shaft seal 48 is provided for tube 41. Intake hole 49 and discharge hole 50 in flange 42 is arranged for providing a sealing fluid, such as water, in cavity 45, 46, which, by virtue of the centrifugal force generated by beveled disc 43, acts efficiently as an end seal preventing any steam or compressed air from escaping. Part of the high pressure leakage of the propellant fluid is permitted to escape through a radially arranged series of small bores 51 which are ending in suitably machined grooves 52 in hollow shaft end 24, which combination of bores and grooves are arranged for bleeding high pressure leakage to the low pressure area. A plurality of sealing rings 53 are arranged on shaft end 24 in lower housing 11 and upper housing 12, and further retainer rings 54, 55 and 56, having sealing rings 57 therein, serve to prevent propellant fluids from escaping from the rotor space and from entering into antifriction bearing 22.

Figure 5:
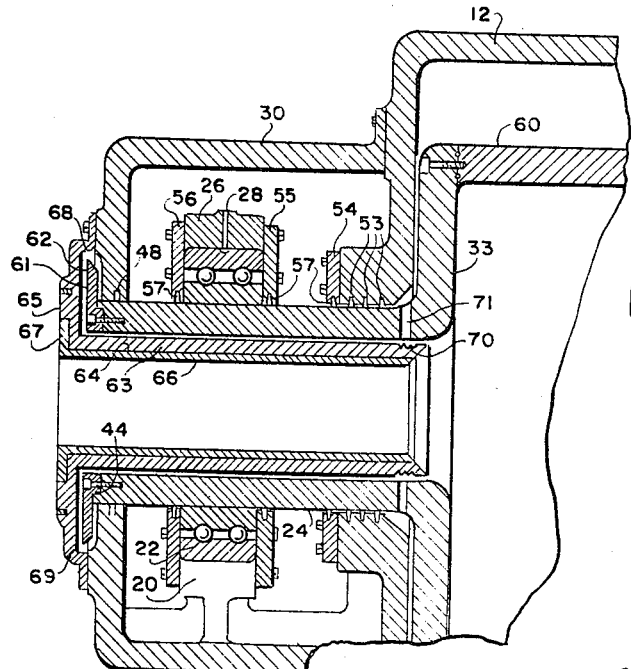
FIG. 5 shows a longitudinal section of the intake end of a turbine similar to that shown in FIG. 1, but having a single stage for hydraulic fluid operation.

When the jet turbine is arranged for hydraulic operation, shaft end 24 of rotor 13 is slightly modified, such as being shown in FIG. 5. Rotor 13 has only one nozzle body 60 in this case. Shaft end 24 extends directly through seal 48 in cap 30 and extension 18 so that disc 61, having beveled edge 62, may be attached directly to end face 44 of shaft end 24. Feed pipe 63 consists of a body 64 which has a flange 65, and of an inner sleeve or liner 66 which is connected to body 64 by a flange 67. Cavity 68 is formed in flange 65 and an outlet 69 for the discharge of leakage water is provided in flange 65. A labyrinth-like seal 70 is formed on the inner end of body 64 and bores 71 are arranged for leading high-pressure leakage water into the low-pressure area.

Shaft end 25 of rotor disc 33 is sealed against propellant fluid leakage in a similar manner. Multiple sealing rings 72, 73 and 74 are arranged in lower housing 11 and in upper housing 12, and retainer rings 75, 76, 77 having sealing rings 78 prevent propellant fluid from escaping from the inner rotor space and from entering into anti-friction bearing 23. An outside retainer ring 79 having a sealing ring 80 provides for protection of anti-friction bearing 23 against entering of foreign matter from the outside.

Figure 6:
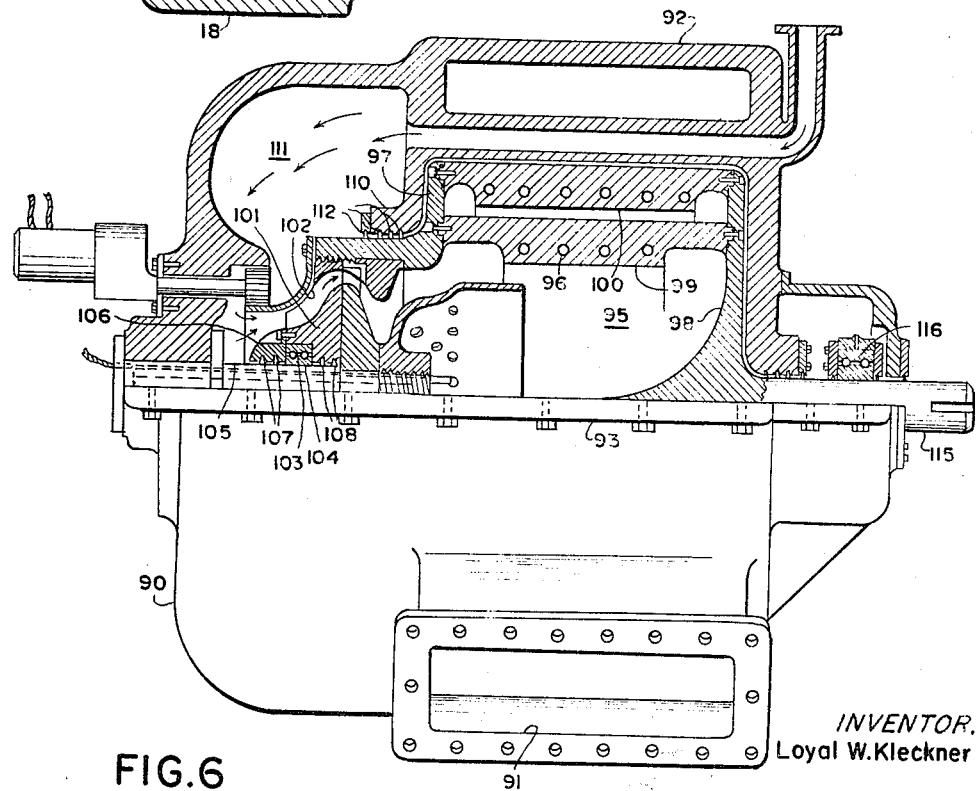
FIG. 6 shows a longitudinal elevation, partly in section, of a multi-stage turbine for internal combustion operation, using combustible fuel as a propellant.

Referring to FIG. 6, there is shown a jet turbine of the internal combustion type for combustible fuel, such as has been described in full detail in my United States Patent No. 3,032,988, partly sectioned, having a lower housing 90 having an opening 91 for the discharge of the exhaust gases, and an upper housing 92. Both lower housing 90 and upper housing 91 are bolted together by means of conventional flanges 93 and 94 (the latter not shown in the drawing). The rotor 95 having a multiple arrangement of jet nozzles 96 consists of side discs 97 and 98 and of the rotor bodies 99, 100 bearing jet nozzles 96. An end plate 101 is screwed into side disc 97. This plate 101 carries the air compressor blades 102 and also contains the anti-friction bearing 103. The inner race of bearing 104 is held on the stationary shaft 105. An end cap 106 on end plate 101 has a plurality of sealing rings 107 for preventing the entry of foreign matter into bearing 104 and simultaneously protecting same against loss of lubricant. Multiple sealing rings 108, inserted in end plate 101 on the side of bearing 103 opposite end cap 106, protect bearing 103 on said opposite side.

Upper housing 92 has a flange-like protrusion 110 extending outwardly into the air intake space 111. A plurality of sealing rings 122 is arranged in said protruding flange, which prevent the hot exhaust gases from escaping from the inner rotor space into air intake space 111.

Figure 4:
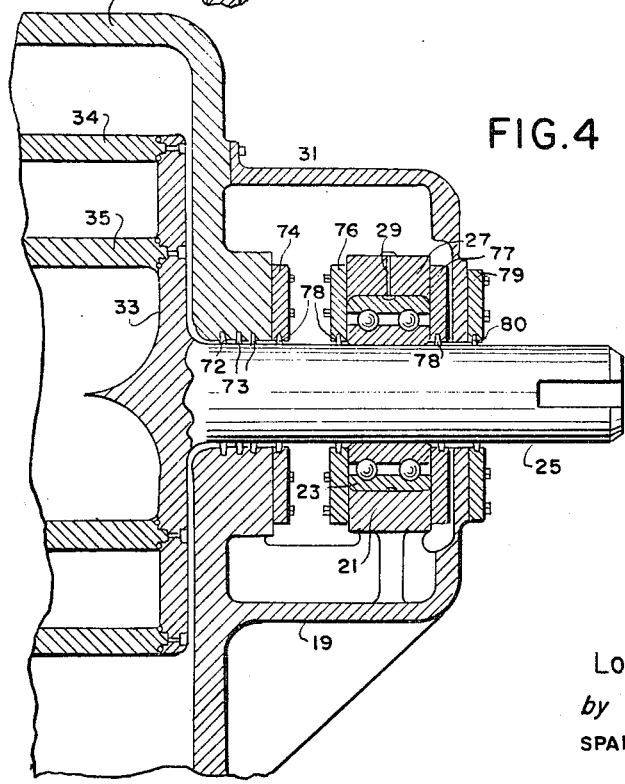
FIG. 4 shows a longitudinal section of the power output end of the turbine shown in FIG. 1 in a larger scale, broken away.

The shaft 115 of rotor 95 is an integral part of rotor side disc 98 and is located in anti-friction bearing 116 in the same manner as it is shown in FIG. 4. Furthermore, the same arrangement of sealing rings, as is shown in FIG. 4 and described in connection therewith, is applied on shaft 115.

The new bearing arrangement as it is disclosed herewith constitutes a substantial improvement of the support of the rotor of the jet turbine. At the same time, a further considerable improvement has been achieved in providing better and more adequate sealing means of the bearings and of the low-pressure spaces from the high-pressure spaces.

Having thus described and illustrated a preferred embodiment of the invention, which gives satisfactory results, it is understood by those skilled in the art after having learned and practiced the invention that further modifications of the embodiment herein shown and disclosed within the spirit and scope of the invention will be enclosed in the following claims.

I claim:
1. In a jet turbine, a combination of a satisfactory housing consisting of a lower and an upper part and a hollow jet rotor having a hollow shaft end extending laterally from said rotor on one side thereof and a solid shaft end extending laterally from said rotor on the other side thereof, said rotor rotatably located in said housing, said housing having end walls, bracket extensions at opposite ends of said lower part of said housing outside said end walls, anti-friction bearings located on said brackets, said bearings supporting said hollow shaft and said solid shaft, separate caps on said bearings and on said brackets, first means in said end walls of said housing for sealing of said shafts, second means sealing separately said bearings and third means on said bracket extensions sealing said shaft ends extending therethrough.

2. In a jet turbine according to claim 1, and having labyrinth-style sealing means on said hollow shaft end at the adjacent housing end wall.

3. In a jet turbine according to claim 2, and having a stationary fluid feed pipe axially extending through said hollow shaft, said pipe having a nozzle ending in said hollow rotor, said stationary pipe having a flange on the end opposite said nozzle, said flange being fixedly attached to one of said brackets and to the corresponding cap thereof.

4. In a jet turbine according to claim 3, and having fluid sealing means on the end of said hollow shaft, said means comprising a disc having a beveled edge, said disc running in a cavity in the wall of said bracket extension and of the corresponding cap thereof, forming therein a fluid ring seal by the centrifugal force acting on said sealing fluid.

5. In a jet turbine, the combination of a stationary housing consisting of a lower and of an upper part and a hollow jet rotor having a hollow shaft end extending laterally from said rotor on one side thereof and a solid shaft end extending laterally from said rotor on the other side thereof, said rotor rotatably located in said housing, said housing having end walls, a bracket extension on one side outside said housing on said lower part thereof, an anti-friction bearing located on said bracket, said bearing supporting said solid shaft, separate caps on said bearing and on said bracket, a stationary shaft having collars, said shaft being fixedly held in said wall of said housing, said fixed shaft extending into said hollow shaft of said rotor, an anti-friction bearing supported by said shaft, said bearing rotatably supporting said hollow shaft end of said rotor, first means in said end walls of said housing for sealing of both said hollow and said solid shafts of said rotor, second means sealing separately said anti-friction bearing in said hollow shaft on said fixed shaft and on said anti-friction bearing in said bracket extension on said solid shaft and third means on said bracket extension sealing said solid shaft extending therethrough.

No references cited.

MARTIN P. SCHWADRON, *Primary Examiner.*

EVERETT A. POWELL, *Assistant Examiner.*